United States Patent
Allen et al.

(10) Patent No.: US 8,700,644 B1
(45) Date of Patent: Apr. 15, 2014

(54) COMPUTERIZED MATCHING AND INTRODUCTION SYSTEMS AND METHODS

(75) Inventors: Christopher J. Allen, Playa Del Rey, CA (US); Clifford W. Allen, Playa Del Rey, CA (US); Carolyn S. Allen, Playa Del Rey, CA (US)

(73) Assignee: Sure To Meet, LLC, Playa Del Rey, CA (US)

( * ) Notice: Subject to any disclaimer, the term of this patent is extended or adjusted under 35 U.S.C. 154(b) by 0 days.

(21) Appl. No.: 13/323,800

(22) Filed: Dec. 12, 2011

Related U.S. Application Data

(60) Provisional application No. 61/459,464, filed on Dec. 13, 2010.

(51) Int. Cl.
*G06F 17/30* (2006.01)

(52) U.S. Cl.
CPC ............... *G06F 17/30702* (2013.01)
USPC ............... 707/754; 706/45; 705/319

(58) Field of Classification Search
None
See application file for complete search history.

(56) References Cited

U.S. PATENT DOCUMENTS

| | | | | |
|---|---|---|---|---|
| 5,842,195 | A * | 11/1998 | Peters et al. ........................... | 1/1 |
| 5,893,098 | A * | 4/1999 | Peters et al. ........................... | 1/1 |
| 5,950,200 | A | 9/1999 | Sudai et al. | |
| 6,272,467 | B1 | 8/2001 | Durand et al. | |
| 7,966,194 | B2 | 6/2011 | Iyer | |
| 2002/0119433 | A1* | 8/2002 | Callender ..................... | 434/322 |
| 2002/0188777 | A1* | 12/2002 | Kraft et al. ..................... | 710/100 |
| 2003/0093405 | A1* | 5/2003 | Mayer ............................. | 707/1 |
| 2004/0034629 | A1* | 2/2004 | Genser ............................ | 707/3 |
| 2004/0054546 | A1* | 3/2004 | Levin et al. ....................... | 705/1 |
| 2004/0093234 | A1* | 5/2004 | Bondi et al. ..................... | 705/1 |
| 2004/0162064 | A1* | 8/2004 | Himmelstein ............. | 455/422.1 |
| 2004/0210661 | A1* | 10/2004 | Thompson .................... | 709/228 |
| 2005/0021666 | A1* | 1/2005 | Dinnage et al. ............... | 709/217 |
| 2005/0075919 | A1* | 4/2005 | Kim ................................ | 705/10 |
| 2006/0059147 | A1* | 3/2006 | Weiss et al. ...................... | 707/6 |
| 2006/0143214 | A1* | 6/2006 | Teicher ......................... | 707/101 |
| 2006/0282426 | A1* | 12/2006 | Spears ............................. | 707/5 |
| 2007/0198324 | A1* | 8/2007 | Borovoy et al. ................ | 705/10 |
| 2008/0119201 | A1* | 5/2008 | Kolber et al. ............. | 455/456.1 |
| 2008/0133716 | A1* | 6/2008 | Rao et al. ...................... | 709/220 |
| 2008/0140487 | A1 | 6/2008 | Fendelman et al. | |

(Continued)

OTHER PUBLICATIONS

Licamele, et al., Social Capital in Friendship—Event Networks, IEEE, 2006.*

(Continued)

*Primary Examiner* — Neveen Abel Jalil
*Assistant Examiner* — Kristofer Biskeborn
(74) *Attorney, Agent, or Firm* — Barceló, Harrison & Walker, LLP

(57) ABSTRACT

Disclosed are systems and methods relating to an automated or semi-automated arrangement of modules that helps gather, process, display, and coordinate meetings among matches based on a set of predetermined and crowd-sourced traits, values, interests, preferences and activities. Such systems of integrated modules in certain embodiments may be used to rank matches in a variety of applications and situations where participants are identified through tailored criteria that organizers, participants and sponsors determine to be most valuable. Embodiments of the present invention may offer advantages and improvements over prior computer and traditional networking and matching systems because they may provide interactive modules that automatically or semi-automatically combine human expertise with automated data management based on the expertise of an event organizer's event-management strategies with real-time and automated data management.

15 Claims, 10 Drawing Sheets

(56) References Cited

U.S. PATENT DOCUMENTS

| | | |
|---|---|---|
| 2008/0146248 A1* | 6/2008 | Himmelstein ............ 455/456.1 |
| 2008/0201425 A1* | 8/2008 | Baker ........................ 709/204 |
| 2009/0005040 A1* | 1/2009 | Bourne ..................... 455/435.1 |
| 2009/0018903 A1 | 1/2009 | Iyer |
| 2009/0163183 A1* | 6/2009 | O'Donoghue et al. .... 455/414.1 |
| 2009/0271212 A1* | 10/2009 | Savjani et al. ................. 705/1 |
| 2009/0276355 A1* | 11/2009 | Willmore et al. .............. 705/40 |
| 2009/0287763 A1* | 11/2009 | Svendsen et al. ............ 709/203 |
| 2009/0307610 A1* | 12/2009 | Ryan ............................ 715/756 |
| 2010/0076998 A1* | 3/2010 | Podgorny et al. ............ 707/772 |
| 2010/0198648 A1* | 8/2010 | Bank et al. ...................... 705/9 |
| 2011/0191352 A1* | 8/2011 | Jones et al. .................. 707/749 |

OTHER PUBLICATIONS

Raban, et al., Hello Stranger! A Study of Introductory Communication Structure and Social Match Success, IEEE, 2009.*

Chen, et al., Improving Matching Process in Social Network, IEEE, 2010.*

* cited by examiner

COMPUTERIZED MATCHING AND INTRODUCTION SYSTEMS AND METHODS

CROSS-REFERENCE TO RELATED APPLICATIONS

This application claims the benefit of Provisional Application Ser. No. 61/459,464, filed on Dec. 13, 2010, the contents of which are herein incorporated by reference in their entirety.

BACKGROUND OF THE DISCLOSURE

1. Field of the Disclosure

The disclosure generally relates to the field of computer network applications, more particularly, for example, to systems and methods in which an automated or semi-automated arrangement of modules helps to gather, process, display, and coordinate meetings among matches based on a set of predetermined and crowd-sourced traits, values, interests, preferences and activities.

2. General Background

Traditional business networking and singles-matching services often provide a crowded experience, in which a participant may have reason to believe that there is someone at the event he or she should meet, but there is no effective mechanism to facilitate meeting the right people and exploring meaningful conversations that could lead to better relationships based on shared interests, values and activities.

Computer-based networking services and dating services may provide more organized methods for classifying participants and for providing a way to screen candidates more efficiently. However, long distances and existing inadequate compatibility-matching methods may result in relatively few qualified matches, and currently known largely anonymous services may be easily manipulated and, thus, may provide relatively high security and safety risks. Local events may provide greater opportunities for face-to-face human vetting of people being matched, but there typically still exists that "crowded room" challenge that may inhibit the ability to meet the best people to meet individual goals.

When people attend meetings, events, or other gatherings it is typically difficult to meet like-minded or compatible people to have a beneficial conversation. Many conversations typically occur between random people, and this may happen because the event organizer has no effective method to facilitate an event participant to meet or be introduced to appropriate people, companies, or other entities that may be of relatively high interest to that participant.

Various matchmaking techniques and systems have been used in some settings, such as singles mixers and business networking events. Some of these known systems have relied on standardized personality tests or other generic questionnaires administered prior to the event at issue. Common complaints of those event structures include: (1) poor matches with the people met; (2) too much time required, resulting in too few high-quality conversations; (3) difficulty in following up with the people who were met at the event.

It is desirable to address the limitations in the art. For example, it may be desirable to provide computer-enhanced methods or systems for sorting through the complexities of networking effectively in a highly individualized world.

SUMMARY

Systems and methods are disclosed with reference to certain exemplary embodiments, relating to an automated or semi-automated arrangement of modules that helps gather, process, display, and coordinate meetings among matches based on a set of predetermined and crowd-sourced traits, values, interests, preferences and activities. Such systems of integrated modules in certain embodiments may be used to rank matches in a variety of applications and situations where participants are identified through tailored criteria that organizers, participants and sponsors determine to be most valuable. Embodiments of the present invention may offer advantages and improvements over prior computer and traditional networking and matching systems because they may provide interactive modules that automatically or semi-automatically combine human expertise with automated data management based on the expertise of an event organizer's event-management strategies with real-time and automated data management.

Certain embodiments may provide mobile, social and local methods for matching responses to shared questions and profile parameters with corresponding and compatible responses for weighted criteria that is personalized to each participant in the system. Embodiments of the present invention may utilize multiple modules of multi-level matching to measure compatibility and like-mindedness of desired traits in the complex process of building human relationships. Certain embodiments may provide participants with valuable feedback and control over data and their selection of matches, and then facilitate connections and meetings among those participants by providing meaningful conversation starters for real-time engagement.

Other aspects and advantages of various aspects of the present invention may be seen upon review of the figures and of the detailed description that follows.

BRIEF DESCRIPTION OF THE DRAWINGS

By way of example, reference will now be made to the accompanying drawings, which are not to scale.

DETAILED DESCRIPTION

Figure 1:
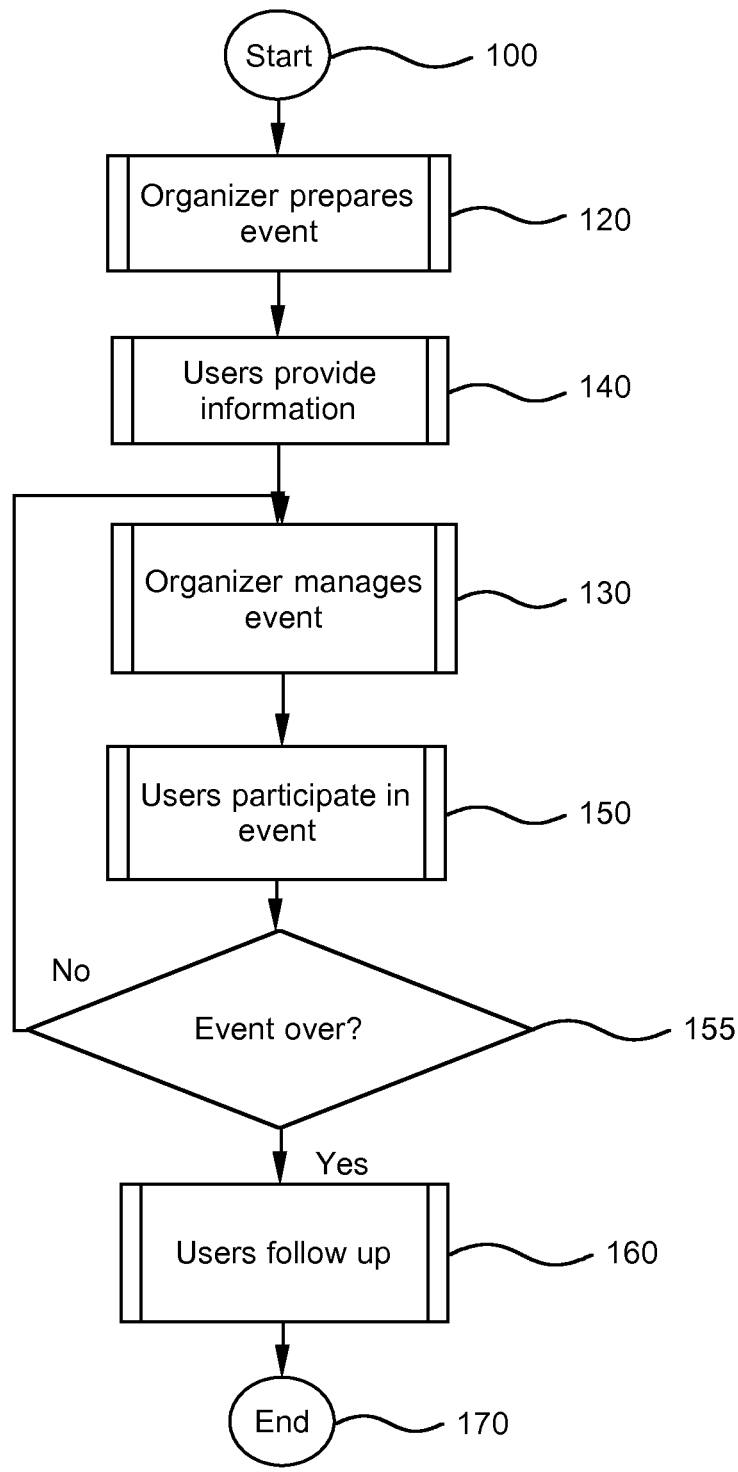
FIG. 1 illustrates the overall process according to an embodiment of the present invention.

Those of ordinary skill in the art will realize that the following description of the present invention is illustrative only and not in any way limiting. Other embodiments of the invention will readily suggest themselves to such skilled persons, having the benefit of this disclosure. Reference will now be made in detail to specific implementations of the present invention as illustrated in the accompanying drawings. The same reference numbers will be used throughout the drawings and the following description to refer to the same or like parts.

Further, certain figures in this specification are flow charts illustrating methods and systems. It will be understood that each block of these flow charts, and combinations of blocks in these flow charts, may be implemented by computer program instructions. These computer program instructions may be loaded onto a computer or other programmable apparatus to produce a machine, such that the instructions which execute on the computer or other programmable apparatus create structures for implementing the functions specified in the flow chart block or blocks. These computer program instructions may also be stored in a computer-readable memory that may direct a computer or other programmable apparatus to function in a particular manner, such that the instructions stored in the computer-readable memory produce an article of manufacture including instruction structures which implement the function specified in the flow chart block or blocks. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flow chart block or blocks.

Accordingly, blocks of the flow charts support combinations of structures for performing the specified functions and combinations of steps for performing the specified functions. It will also be understood that each block of the flow charts, and combinations of blocks in the flow charts, may be implemented by special purpose hardware-based computer systems which perform the specified functions or steps, or combinations of special purpose hardware and computer instructions.

For example, any number of computer programming languages, such as C, C++, C# (C-Sharp), Perl, Ada, Python, Pascal, SmallTalk, FORTRAN, assembly language, and the like, may be used to implement aspects of the present invention. Further, various programming approaches such as procedural, object-oriented or artificial intelligence techniques may be employed, depending on the requirements of each particular implementation. Compiler programs and/or virtual machine programs executed by computer systems generally translate higher level programming languages to generate sets of machine instructions that may be executed by one or more processors to perform a programmed function or set of functions.

The term "machine-readable medium" should be understood to include any structure that participates in providing data which may be read by an element of a computer system. Such a medium may take many forms, including but not limited to, non-volatile media, volatile media, and transmission media. Non-volatile media include, for example, optical or magnetic disks and other persistent memory. Volatile media include dynamic random access memory (DRAM) and/or static random access memory (SRAM). Transmission media include cables, wires, and fibers, including the wires that comprise a system bus coupled to a processor. Common forms of machine-readable media include, for example, a floppy disk, a flexible disk, a hard disk, a magnetic tape, any other magnetic medium, a CD-ROM, a DVD, and any other optical medium.

The manner in which embodiments of the present invention accomplishes these objectives is explained in more detail herein and in the following discussion.

While systems and techniques according to certain embodiments of the present invention may be used in various ways, the discussion that follows describes how the systems and methods according to techniques provided by certain embodiments may be used for an "event" where people gather together, including physical events and virtual events.

Methods and systems according to certain embodiments enable compatible people to meet, and to exchange contact information with other users so they may contact each other after the event.

Physical events represent events at physical venues. These events usually last for only a few hours, such as singles mixers or business networking mixers. However they may also be periodic gatherings over several days, such as at a multi-day convention or conference.

Virtual events represent electronic meetings that are usually held when the users are not able to be at the same physical venue simultaneously. Virtual meetings may occur over an extended period of time. Virtual events may include video conferences, audio conferences, textual chat sessions, and the like.

These events are organized and managed by one or more organizers who manage the process from their computing devices, such as a laptop computer or mobile phone, using an interface such as a Web browser connected to the Internet.

Using the system according to certain embodiments, an organizer invites participants who may want to meet each other, such as single people, business people, community newcomers, or members of an association.

A matching module according to certain embodiments is designed to combine human intelligence and emotional instincts with a computer tool that helps manage personalized data quickly, efficiently and locally to facilitate human conversation and on-going interactions.

Business management modules according to certain embodiments are designed to develop strong communities by providing computer tools for organizers and sponsors to make their business data available for management decision-making, and by making it easy to tailor events to the event participants' unique interests and goals, thus delivering a more valuable solution for each group of event participants. Every group has its own personality that results from personalities, ages, seasonality, economic factors, and more sociological factors than any computer system may typically adequately address with a static system.

The present invention according to certain embodiments offers advantages and improvements over prior computer matching systems because it provides a personalized, crowd-sourced system and methods for matching event organizers and sponsors; matching organizers and participants; and matching participants with one another and with sponsors which may meet their desired characteristics for a highly relevant "first conversation." Embodiments of the present invention utilize multiple levels and types of matching through employing crowd-sourced questions, selected criteria and weighted processing, which not only measure like-mindedness, compatibility and current focus, but also how well each participant fits the personalized priorities of the potential match. Systems and methods according to certain embodiments use a multiple-point Likert scale to collect participants' answers to questions. The importance of each question may also be specified, and may be used for weighing those criteria more or less heavily in the matching process.

As described more fully herein, embodiments of the present invention offer advantages and improvements over prior registration and matching systems because they provide more control for the event organizer in preparing the event design and in moderating the event in real-time using technology such as mobile communication technology. Customizable, personalized and real time controls empower the event organizer to customize each event to the people in attendance, thus improving the speed of meeting, and the quality and quantity of matches made among participants. Embodiments of the present invention also provide greater involvement of the participants using mobile media, personalization techniques, and crowd-sourced techniques to improve the quality of matches and personal control of participant matches that are fostered through human relationship skills applied with at-event conversation aids to meet specific individual needs tailored for each specific group's make-up.

Embodiments of the present invention provide methods and systems for collecting event configuration data to assist people in a group setting, using personalization techniques, real-time technologies, crowd-sourced questions and engagement, interactive techniques on mobile devices and organizer-tailored and moderated event logistics to meet like-minded and compatible people in real-time at the event who are closely matched in terms of interests, values, attitudes, lifestyles, (VALs) activities, and other compatibility factors. This is done in certain embodiments by asking people in the group to fill out a profile, select choices from customized typing criteria, and also answer a set of custom questions ("matching questions"), then comparing the users in real time using segmentation and personalization techniques so that a list of the best like-minded and/or compatible matches in the group may be provided to each person. Depending on the requirements of each particular implementation, event configuration data may include basic event data (e.g., event date and time, costs and fees, type of event, event description, privacy settings, event and organizer contact information, initial list of attendees), customized typing criteria, matching questions, and/or rules and regulations regarding information sharing before, during, and/or after the event.

Certain embodiments of the present invention also use personalization principles to adjust matching criteria to provide for more personalized matches. For example, organizers and participants may specify their own personalized importance weighting for questions that are used in computing match scores. Personalization may also be used to determine who is invited to events based on profile values such as location and interests. Sponsors' offers may be personalized to match the interests and activities of participants.

The invention in certain embodiments may also use geolocation principles to locate one or more event participants and select a meeting spot that is convenient to any two participants that is weighted with available space in that location.

Certain embodiments may facilitate users to recommend additional matching questions or typing criteria to the organizer in real time. This real-time, crowd-sourced addition of matching questions according to certain embodiments may allow a system to improve the quality of matching for specialized or unique groups. The systems and methods of crowd-sourced acquisition of questions and criteria may provide a more specialized, and more prioritized list of candidates for a participant to meet.

Certain embodiments also use communication and social media interconnections to foster ongoing communications and arrangement of follow-up shared activities to foster budding relationships.

Participants may also refer one participant to another at or after the event and some or all of the three parties may be notified of the human-match recommendation. Organizers may also refer participants to one another and organizer referrals may be given weighted importance to reflect their knowledge of participants and skill in relationship development. An interface is provided to present to a user the list of other attendees referred to them and to view information about the referred participants. The participants are provided with a control to acknowledge the referral and to request a meeting and/or a connection with the referral.

The match comparison in certain embodiments may be performed in certain embodiments by comparing the users' selections of typing criteria and/or their answers to customized matching questions, and/or other information provided by the user, such as the text in their profiles, and their interests identified in their profiles and compiling a match score between the user and each available candidate at the event, using both the user's responses and each candidate's responses to the matching questions and the importance weights specified by the organizer, the user, and each candidate.

For example, in one embodiment, each participant may have the option to set his or her perceived importance for a question to a value from 1 to 3, and the organizer may set his or her importance for the question to a value from 1 to 3. The values user_answer_value and other_answer_value may be numbers from 1 to 5. Calculate the participant's average importance weighting for all the matching questions they answered, as my_avg_importance. Calculate the candidate's average importance weighting for all the matching questions they answered, as other_avg_importance.

Then, for each question, the following steps may be performed:

Calculate the question's relative importance for the user, as my_importance. For example: My_importance=question importance−my_avg_importance+2.

Calculate the question's relative importance for the candidate, as other_importance. For example: Other_importance=question importance−other_avg_importance+2.

Calculate participant_importance=max(my_importance, other_importance, 0.75).

Calculate overall_importance=(participant_importance+organizer_importance)*0.5.

Calculate Question_weight=20+(overall_importance−1)*40.

Calculate the question_score:

If the question uses a similarity score (e.g., like/dislike):
Calculate delta=user_answer_value−other_answer_value.
Calculate question_score=100−abs(delta)*20.

If the question uses a non-neutral difference match (e.g., have/want):
Calculate delta=max(0, (−1*user_answer_value−3)*(other_answer_value−3).
Calculate question_score=20+(20*delta)

Add (question_score*question_weight) to total_score.
Add question_weight to total_weight.
Calculate final_score=total_score/total_weight.

Some embodiments may use the match comparison to display to the user the computed match scores for the available candidates, displaying the list of matching questions they have given the highest weights with their responses, displaying the list of matching questions that their available candidate matches have given the highest weights, with their average responses, displaying to the user some of the selected matching questions as potential conversation starters for when they meet as well as displaying to the user the list of matching questions their connections have given the highest weights along with their average responses.

The system may include "kits" of pre-configured interfaces for creating an event using a simplified interface with limited sets of predefined configurations including typing criteria and other settings that may reflect specialized group events. For example, an organizer may select a "freelance wordsmithing"

kit preconfigured to match the business networking goals of a graphics trade association with members who specialize as freelance writers, editors, publishers and Web designers. Specialized typing criteria could include specialized freelance tasks, job titles, application profiles, and purchasing agents such as art director, creative director, production manager and marketing manager, among other typing criteria. Customized sets of relevant matching questions could include Mac computer skills, PC computer skills, Unix computer skills, as well as varying levels of skill that would be appropriate for the specialized group: e.g., entry level, mid-level mastery, expert-level mastery. Matching questions may include such unique questions as: pharmaceutical packaging, social media messaging, software instruction manuals, or children's book cover design. Event participants may contribute additional questions to reflect their skills, interests, values and applications, as they seek to meet their networking goals.

In addition, the methods and systems according to certain embodiments may provide introductions of pairs of matched people, and for those pairs of people to easily find each other during an event, carry on a conversation that may be stimulated by "conversation starters" based on shared and high value match topics, and may select to connect using telephone, social media and other methods to plan shared activities following the event.

Organizers may be provided with an interface for creating a list of meeting spots at the venue at which the event is being held, or virtual meeting connections for events being held virtually.

The participant is provided with a control at the event to request meeting an available candidate and is presented with notification when a candidate requests to meet the participant. The system automatically selects a meeting spot from the organizer's list of meeting spots and the meeting spot is presented to the user and the candidate. The participants are provided with a means to indicate when the meeting has concluded, and to add notes to their journal about their impressions of the meeting. Participants are provided with an interface to store and retrieve and edit notes from the participant about the other users.

In some embodiments, the participant is provided with a control to request a connection with another user and is presented with notification when another user requests to connect. After both users have approved a connection, both users' contact information is added to each other's list of connections. An interface is provided for participants to review their list of connections and list of requested connections, and to review approved connections' contact information.

Organizers may be provided with an interface for optionally searching the master library for matching questions, typing criteria, policies, rules and regulations and other elements that meet the organizer's search criteria. Organizers may optionally copy some or all of the preferred elements from the master library to his or her library for use at future events. An organizer may also create and organize new questions in his or her library and assign some or all of them to an event. The system allows the organizer to weight the importance for each question associated with the event in order to refine the calculation of participants' responses for the compiled matching score for each pair of users. The system may store the organizer's edits to the matching questions selected or added along with their properties for use at future events.

Depending on the requirements of each particular implementation, the system in certain embodiments may provide the organizer with a way to contribute questions or sets of questions into the master library and to be credited with their contribution and asked for their permission for use by other members of the organizer community The business systems according to aspects of the present invention provide organizers and sponsors with methods to describe their offerings, invite people to the event, register participants, and select and/or create matching questions that participants may respond to as they shape their matches at the event. The methods and systems according to certain embodiments also provide processes and modules to facilitate people to easily meet at the event as well as connect after the event through the use of social media, phone or shared activities. Sponsors are similar to organizers, and are provided with methods and systems according to certain embodiments through which they may participate in shaping the event and participant connections by selecting, editing and distributing their information and offers to particular communities of event participants, connect through Internet connections, and arrange for follow-up meetings or sales of goods or services.

The organizer's interface may enable the organizer to send messages to individuals or groups of users, as well as enable the organizer to receive messages from users and present the messages to the organizer for review, editing, response, deletion and sharing with some or all of the participants.

Dynamic business management and matching systems and methods according to aspects of the present invention may help users to find and connect with compatible users by asking people a set of typing criteria that collects customized typing criterion for a specific event. The system provides the organizer with an interface to customize the typing criteria, apply segmentation and/or personalization attributes, and to associate the custom typing criteria with a specific event. Typing criteria are used to filter the set of candidate participants for each user in order to restrict the list of candidate matches to meet the users' strict requirements. Segmentation and/or personalization may be used to filter the set of matching questions that are presented to each participant based on their segmented or personalized choices. For example, at a singles' event, a "male" participant might want to set a strict requirement of "female" candidate matches, and a "female" participant might set strict requirements of both "female" and "male" candidate matches if she also wants to meet female friends at the event.

Embodiments of the present invention provide an interface for an event organizer to be able to customize typing criteria and select and apply related segmentation and/or personalization techniques to tailor a user's experience to the specific group of participants attending the event. For example, the event organizer may create or select from the master library of typing criteria with related segmentation and/or personalization attributes, a typing criterion called "Profession" with possible values of "Entrepreneur," "Investor," "Attorney," "Accountant," or "Purchasing Agent." Each participant may then indicate one profession that applies to him or her, and then may select one or more professions that indicate preferred types of people to meet at the event. As another example, an organizer for a singles mixer may create a typing criterion called "Age Group" with values of "20's," "30's," "40's," and the like, and then each participant would indicate his or her age group and one or more age groups of participants that he or she would like to meet at the event.

Organizers may be provided with a system and interface for an organizer to manage event operations, comprising the means for indicating which matching questions, and in which order, the matching questions will be distributed to participants. Organizers may monitor the participant's submission interface used for presenting user-submitted matching questions to the organizer and through the organizer's interface order, edit, and approve the crowd-sourced questions for distribution to the event participants.

The customizable, flexible segmentation and/or personalization system of typing criteria execution may allow participants to refine their typing criteria during the event, for example, an "entrepreneur" might also be an "investor" and after exploring contacts that match his entrepreneurial goals, may add or switch participant typing criteria to "investor" in order to meet "entrepreneurs" who might fit a secondary goal. Segmentation and personalization processing may also speed highly matched results by reducing the number of matching questions to be answered to only those that apply to highly appropriate typing criteria.

Certain embodiments also use customizable, and/or segmented/personalized profiles for public or connection sharing with the event public and/or matches and/or connections. Organizers may use segmentation and/or personalization techniques to edit profile options for participants through their organizer interface. Participants may select options and edit their profile attributes at any time during registration and during attendance at the event, or after the event in line with the organizer-selected policies.

The profile may collect the user's personal data as free-form text and the system may analyze the user's text using techniques such as frequency analysis or cluster analysis across all users' profiles to identify key terms. This analysis may be used for computing a user profile score for each pair of users reflecting key terms their profiles have in common. The system may store and display to the organizer the key terms identified in users' profiles from the analysis.

Dynamic business management and matching systems and methods according to aspects of the present invention may help users to find and connect with compatible users by asking people a set of matching questions created or compiled by the organizer of the event. Matching questions may have an associated compatibility comparison type, which may be either a direct correlation (e.g., with "agree/disagree"), or some form of inverse correlation of responses, such that two responses to a question may have a higher score the further apart the responses' values are (e.g., with "have/want"). Attendees may thus find people with like-mindedness, and people with opposite or complementary attributes. For example, an entrepreneur can find team members with different skills, such as an attorney, accountant or engineer, and may also find fellow entrepreneurs with like-minded interests and business goals.

In addition, the systems and methods according to certain embodiments may facilitate users to recommend additional matching questions to the organizer in real time. This real-time addition of matching questions according to certain embodiments may allow a system to improve the quality of matching. The systems and methods according to certain embodiments may provide a prioritized list of candidates for a user to meet. For pairs of users who want to meet, the systems and methods may facilitate their meeting at a convenient conversation spot, and may encourage meaningful conversation by ranking shared interests as conversation starters and displaying them in real-time on their mobile device, such as but not limited to cell phones, tablets, and portable computers.

Certain embodiments also use customizable, and/or segmented/personalized matching questions or question sets for an event, which the event organizer may search and select from their organizer's library or from the master library available to all organizers who use the systems and methods according to such embodiments. The organizer may optionally copy matching questions and attributes from the master library to their organizer's library, collecting a set of new matching questions from the libraries and storing them in the organizer's library. The organizer may copy a set of matching questions from the organizer's library to a specific event, along with an indication of the organizer's weight of importance for each question associated with the event, and segmentation and/or personalization attributes to be used in the calculation of a compiled matching score for each pair of users.

Matching questions have associated segmentation and/or personalization attributes and one or more compatibility comparison types, which may be either a direct correlation (e.g., with "agree/disagree"), or some form of inverse correlation of responses, such that two responses to a question may have a higher score the further apart the responses' values are (e.g., with "have/want"). The system may store the organizer's original matching questions and edits to matching questions and their properties.

The organizer's interface for editing the matching questions accepts the organizer's selection of some or all of the matching questions published to the event, to be saved as a set for future use. The organizer may select segmentation or personalization techniques for each matching question. Additional data from the event's matching questions are also saved for the organizer, including importance weight and user data including aggregated responses, importance weights, ratio of response, segmentation categories, personalization attributes and source information. Depending on the requirements of each particular implementation, user data may include some or all of the data that has been submitted and that responds to or relates to event configuration data, such as, without limitation, responses to customized typing criteria, responses to matching questions, and/or user-specific details concerning rules and regulations on information sharing before, during, and/or after the event.

The organizer may use the matching question interface to indicate whether to share his or her matching questions with other organizers or with the entire system through the master library of questions. The system may provide an interface for the system administrator to approve and categorize the organizer's submitted matching questions, and to trace the source of the questions and attributes. The system may provide an interface for the system administrator to release entire "event kits," consisting of sets of typing criteria, sets of matching questions, or individual elements to the master library along with tracking origin and attribution data. In certain embodiments organizer contributions to the master library may be tracked and be enhanced with a monetization module.

The master library further comprises analysis of the master and organizer typing criteria, matching questions, subject-matter expert questions, to match the master library sets of matching questions and typing criteria. Analysis may include popularity of individual matching questions and typing criteria, associated compatibility comparison type, which may be either a direct correlation (e.g., with "agree/disagree"), or some form of inverse correlation of responses, such that two responses to a question may have a higher score the further apart the responses' values are (e.g., with "have/want"). Analysis may also be comprised of analyzing the popularity of the organizer's matching questions, by comparing among the organizer's library and the master library, the ratios of users' response rates and importance weighting of questions.

Participants may associate attributes to each of their personal typing criteria and/or matching question such as additional importance weights. The system may include these participant selected and/or edited importance weights into each person's matching process.

Participants may also be provided with the ability to submit matching questions using crowd-sourcing techniques, to the system while at the event, which may be presented to the organizer for moderation, then edited and approved for distribution. The organizer may edit and choose which questions to present to some or all of the event's participants by editing for segmentation and personalization processes. For example, an organizer for a mixer at a manufacturing conference may select the matching question submitted by a participant, "bulk quantities of ball bearings" and assign it a comparison type of "have/want". The "have/want" question type according to certain embodiments allows the system to appropriately match participants with complex compatible goals. As another example, an organizer for a singles mixer may choose the matching question submitted by a participant, "science fiction movies" and assign it a comparison type of "like/dislike". This system's open-ended approach to processing customizable matching questions and typing criteria may enable the system to adapt to the thousands of career classifications available in the working world, business and public sector organizations, and the endless personalities and goals of individuals who work and play within unique or specialized community groups.

By providing a prioritized list of matches according to certain embodiments, a user may choose which compatible users to meet. Then, to be assured of finding someone they do not yet know, systems and methods according to certain embodiments may provide both users with each other's information and history of past meetings. In some embodiments, participants might want to meet past matches to further the relationship and explore additional conversation topics. The system's provision of history of past meetings provides participants with journaling notes, as well as past matching information. Thus, participants may be provided with a journaling feature through which they may add and edit notes about their participant meetings and connections at the event and after the event has concluded. Participants may also be provided with instructions on how to locate each other during the event.

According to certain embodiments, event organizers may be provided with a robust interface and system for planning, promoting, and managing the event through interfaces that manage event planning, sponsorships, user activities, and statistics to profile each specific group event. In one embodiment, a system may be used by an organizer for a group of people, typically at an "event." Events may be "face-to-face" gatherings at a physical venue, or events may be "virtual" that use only an online presence for each user, or events may include a combination of physically present and virtual users.

Participants may be shown a list of matched participants at the event, along with a score based on matching responses. The questions that contribute the most to each matched pair are displayed as "conversation starters" during the introduction and may be used to ease or increase the value of first conversations between matched participants. Customized conversation starters may be provided at the event by displaying highly ranked matching questions on each person's mobile display device, e.g., if both users have indicated that they like golf, they will see the conversation starter "like golf," and this personalized content may also be used for personalized content in social media messaging. Segmented and personalized information may also be shown to each participant based on collated information from segmented and/or personalized participant profiles, typing criteria and matching questions.

In certain embodiments, the system provides a mechanism for the users to exchange contact information to foster the relationship beyond the time limits of the event. Multiple platform connections may be processed to simplify and enhance the exchange of segmented and/or personalized connection information such as telephone numbers, email addresses, text addresses, instant messaging, and the like. In certain embodiments participants can block problematic connections, while acknowledging that social media connections must be managed through appropriate interfaces.

In certain embodiments, the system provides a master library which serves as a storage mechanism for the organizer to select, edit, store and share elements that may be used for event design, event operation and post-event data analysis. The master library may include typing criteria and matching question sets provided by the system creators, contributed by organizers, recommended by sponsors, and contributed by relevant subject matter experts.

The master library may include typing criteria and matching question sets along with related segmentation, personalization and weighting attributes created and contributed by relevant subject-matter experts for use by organizers in planning their event program.

The system allows in certain embodiments the event organizer to select follow-up rules and regulations to manage participant access to the participant and sponsor databases and connection capabilities. This optional management control may be used for example, to manage sponsor offers, or to encourage return attendance at events balanced with the participants' needs to review potential matches in the quiet of their home or office, and pursue connections beyond those matches they could meet and converse with at the live event.

The organizer's interface in certain embodiments provides a means for analyzing users' responses, flagging problematic occurrences, and presenting them to the organizer for management decision-making and action. The organizer's interface may provide utilities for collating and displaying data about users' interactions with the system and information about their meetings. The organizer's interface may include a means for displaying real-time statistics about the meeting on additional displays for users to see, as specified by the organizer, which may include multiple key metrics including the number of matching questions answered, number of meetings between users, and number of connections established at the event.

Participant responses may be tabulated by the system and actual results may be stored, analyzed and displayed for the organizer's use in evaluating the effectiveness of each of their selected questions. For example, the system may analyze the popularity of the organizer's matching questions by comparing questions found in the organizer's library and the master library, including aggregated responses, importance weights, and ratio of response. The system may analyze the matching questions' associated compatibility comparison type, which may either use a direct correlation (e.g., with "agree/disagree"), or some form of inverse correlation of responses, such that two responses to a question may have a higher score the further apart the responses' values are (e.g., "have/want").

Some embodiments provide a method for the organizer to plan, create, select, edit and distribute follow-up messages to participants after the event has concluded. The system may automatically select interests and activities with a high level of compatibility between a participant and each connection established at the event, as indicated by the users' matching questions and profiles. The system may automatically send personalized messages to the user, as specified by the organizer, presenting either the automatically selected interests and activities for the participant's new connections, a reference to the sponsors' offers, among other embodiments.

FIG. 1 describes the general process according to certain embodiments. The process begins at step 100. At step 120, the organizer indicates what information the system should collect from users, as described by FIGS. 2A and 2B. In step 140, the users provide information about themselves to the system, as described by FIG. 4. In step 130, the organizer manages the matching process of the event, as described by FIG. 3. In step 150, the user participates in the event, as described by FIGS. 5A, 5B, and 5C. In step 155, the organizer determines whether the event has concluded. If the result is negative, the process returns to step 130. If the result is affirmative, the process proceeds to step 160, where the user follows up after the event, as described in FIG. 6. The general process according to such embodiments terminates at step 170.

Figure 2A:
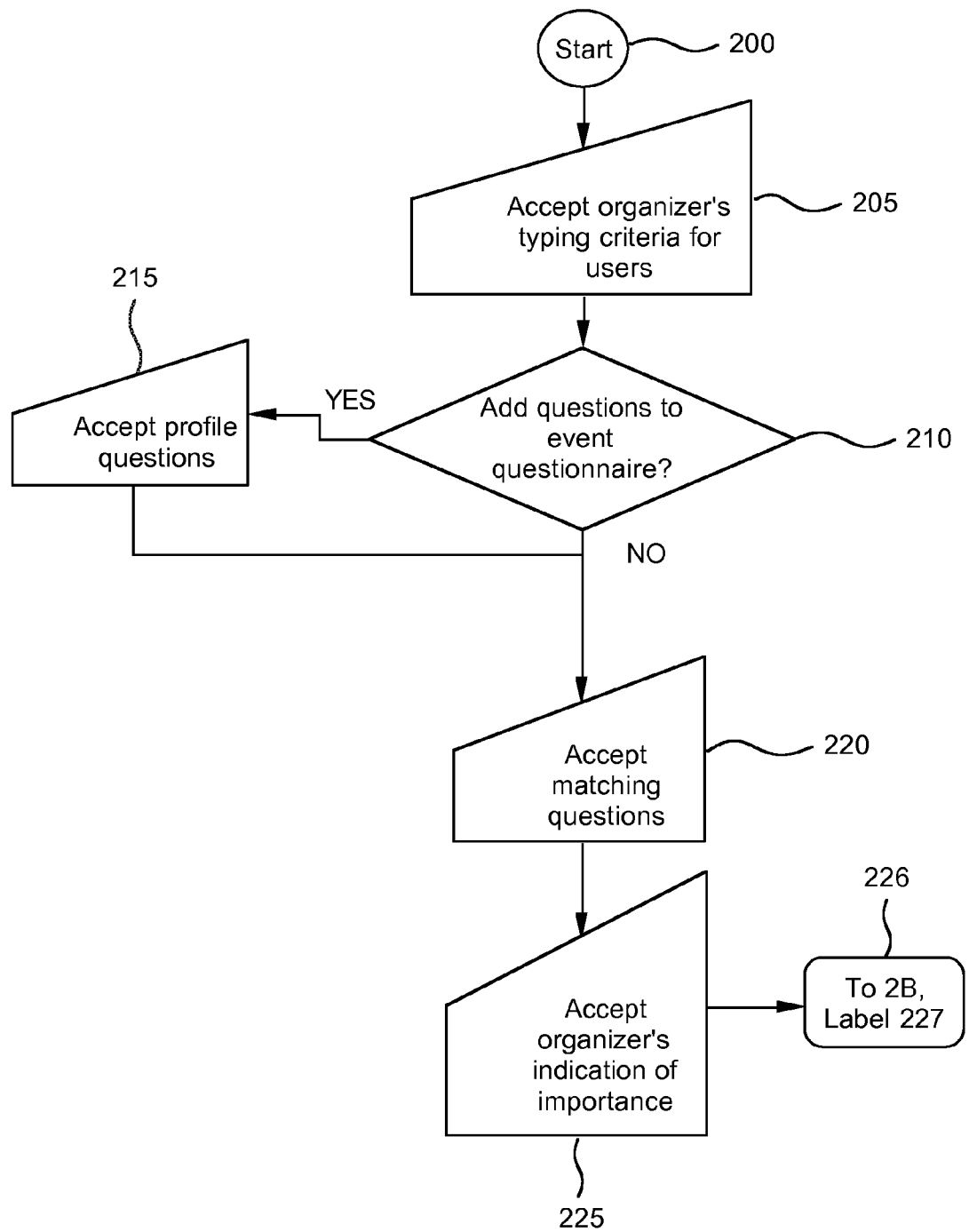
FIGS. 2A and 2B illustrate an exemplary system with which the organizer sets up and configures the event.
Figure 2B:
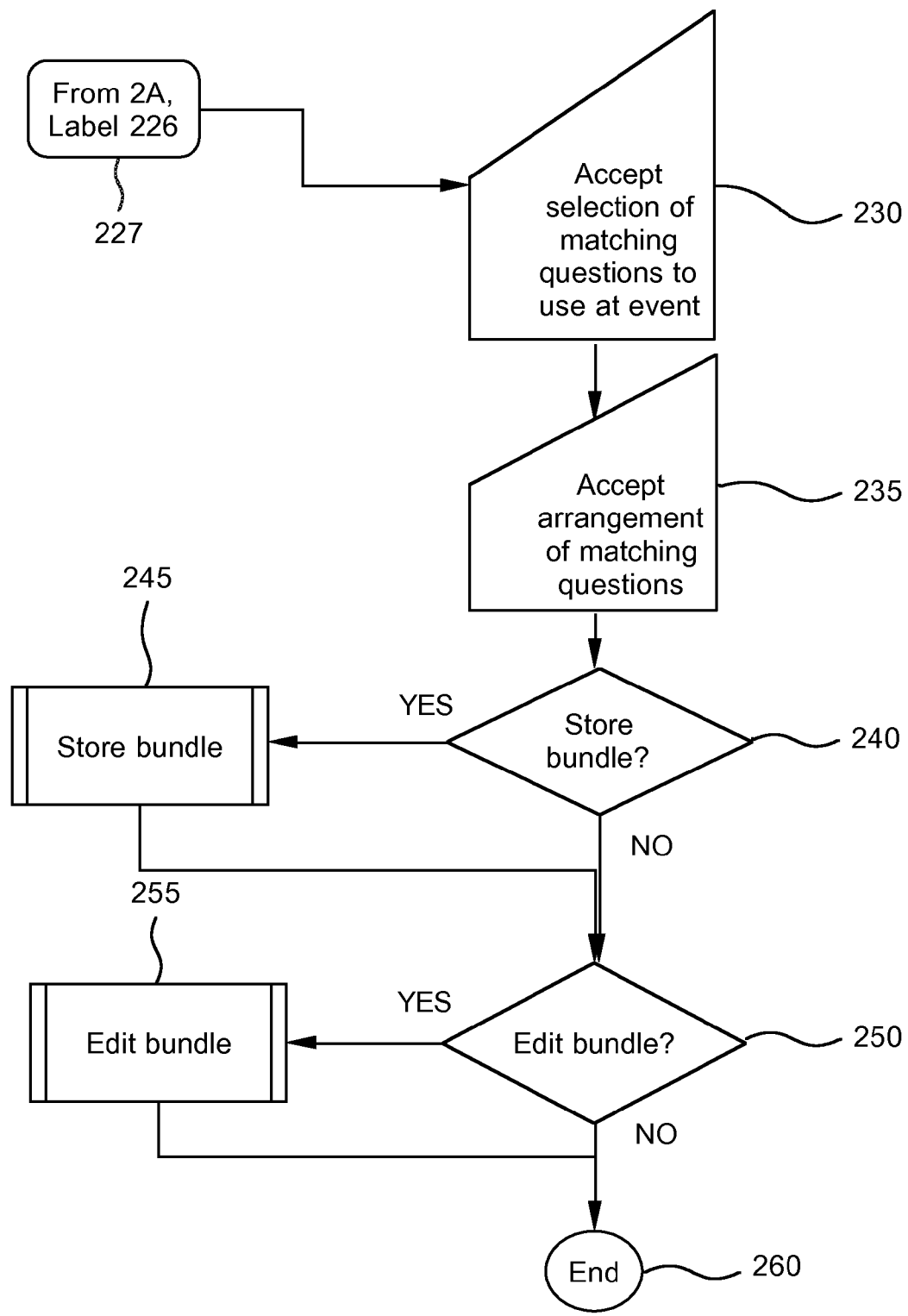

FIGS. 2A and 2B describe the process of creating an event with input from an organizer in one embodiment, as summarized by step 120. The process begins at step 200. At step 205, the system accepts the organizer's input of typing criteria. These typing criteria will be used during the event for users to indicate their own type and to indicate which types of users they are interested in meeting (e.g., for a singles event a user might be a male interested in females, or for a business event a user might be a seller interested in buyers). At step 210, the system responds to the organizer's choice as to whether to add questions to the event's questionnaire. If the result of step 210 is affirmative, at step 215 the system will accept the organizer's addition of questions to the questionnaire in event invitations.

At step 220, the system accepts the organizer's selection of matching questions from a library of matching questions, or matching questions created by the organizer. As part of this step, the system accepts the organizer's indication for each matching question which method of compatibility comparison to use and the label to attach, e.g., like/dislike, agree/disagree, or have/want. At step 225 the system accepts the organizer's indication of the importance of each question. At step 230 the system accepts the organizer's selection of which matching questions to use for an event. This selection will be specified via a form presented to the organizer on a web browser. At step 235 the system accepts the organizer's arrangement of the order of the matching questions to use for an event. At step 240 the system responds to the organizer's choice of whether to store their unique bundles of matching questions for future use. At step 245 the system stores with the organizer's profile the bundle and a label indicated by the organizer.

At step 250 the system responds to the organizer's choice whether to modify these bundles of matching questions. If the result of step 250 is affirmative, the system proceeds to step 255 where it applies the modifications to the bundles of matching questions provided by the organizer. The process terminates at step 260.

Figure 3:
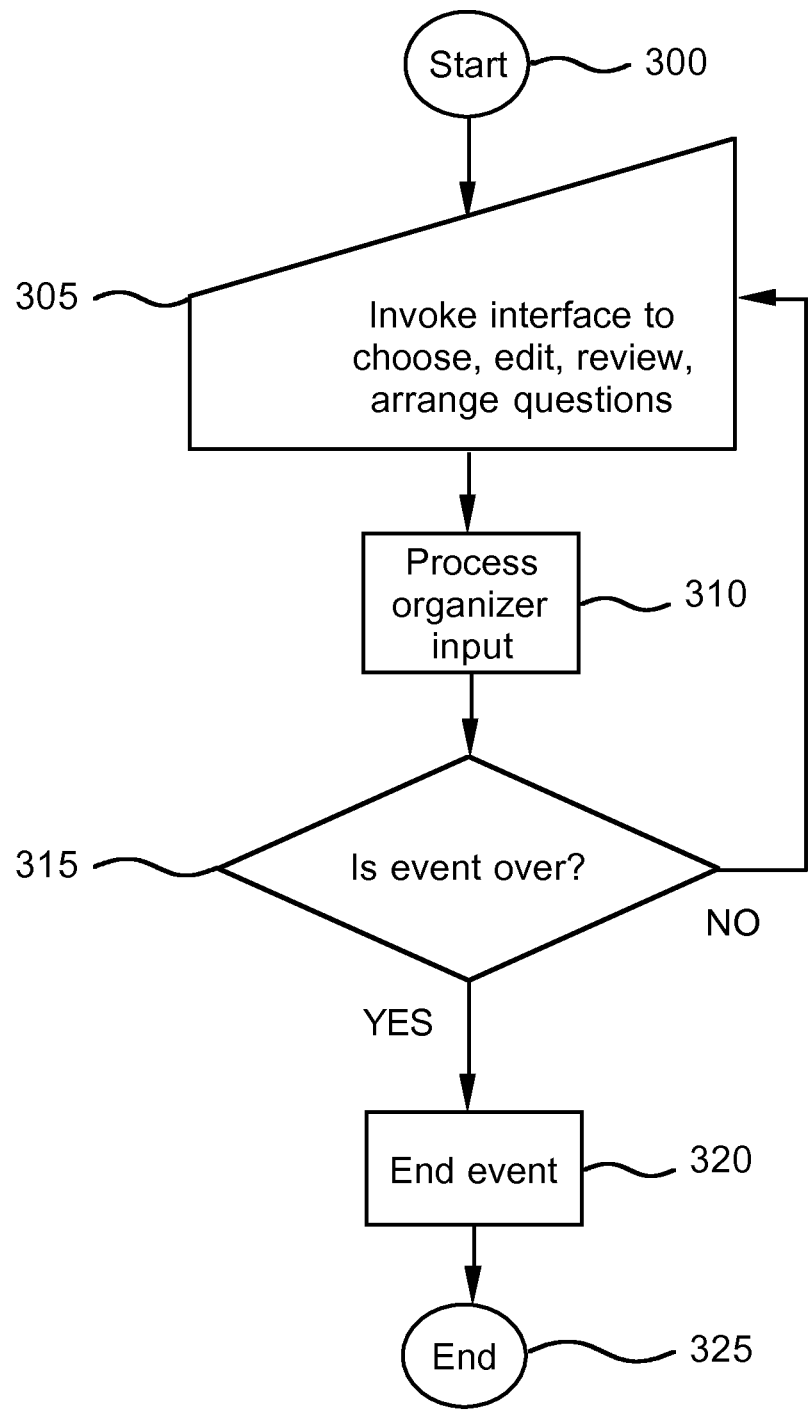
FIG. 3 illustrates an exemplary system with which the organizer moderates the event.

FIG. 3 describes the process of the system managing the event under the direction of the organizer, as summarized by step 130. The process begins at step 300. In step 305 the system invokes an interface for the organizer to choose, edit and arrange matching questions that an organizer had selected prior to the event, and to review, edit, and arrange matching questions entered by users, and selects which matching questions to distribute to users. In step 310 the system processes the organizer's input. In step 315 the system responds to the organizer's choice whether the event has concluded. If the result is negative, the system returns to step 305 and continues to provide an interface for the organizer to examine questions for the users. If the result of step 315 is affirmative, the system proceeds to step 320, where it changes the event's status from active to concluded. The process terminates at step 325.

Figure 4:
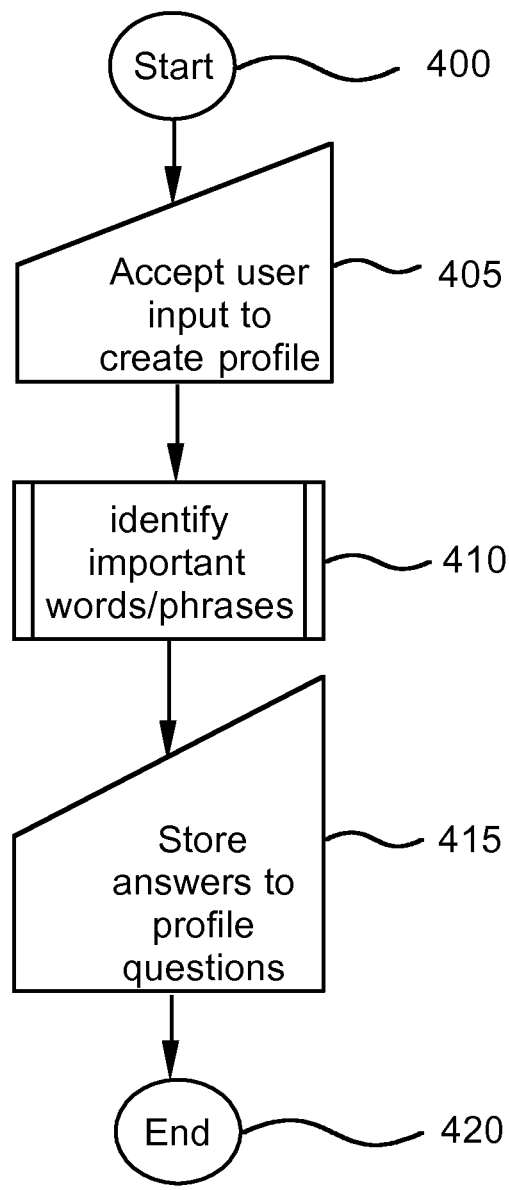
FIG. 4 illustrates an exemplary system with which a participant prepares for the event.

FIG. 4 describes the system's processing of the user's information in preparation for an event as summarized by step 140. The process begins at step 400. In step 405 the system accepts the user's input in order to create a profile. This input typically consists of a textual description, contact information, and preferences for sharing this information with other users, and optionally a selection of one or more interests and the upload of photographs. In step 410 the system analyzes the most important words or phrases in the user's textual description of themselves. One possible analysis of the users' descriptions could be performing a frequency minimization analysis across all users' profiles. For example, if only two users use the term "hiking," this would be a low-frequency term, which would give it a high importance. Other possible analyses could be used additionally or alternatively, such as cluster analysis. In step 415 the system stores the user's answers to profile questions created by the organizer in step 215. The process terminates at step 420.

Figure 5A:
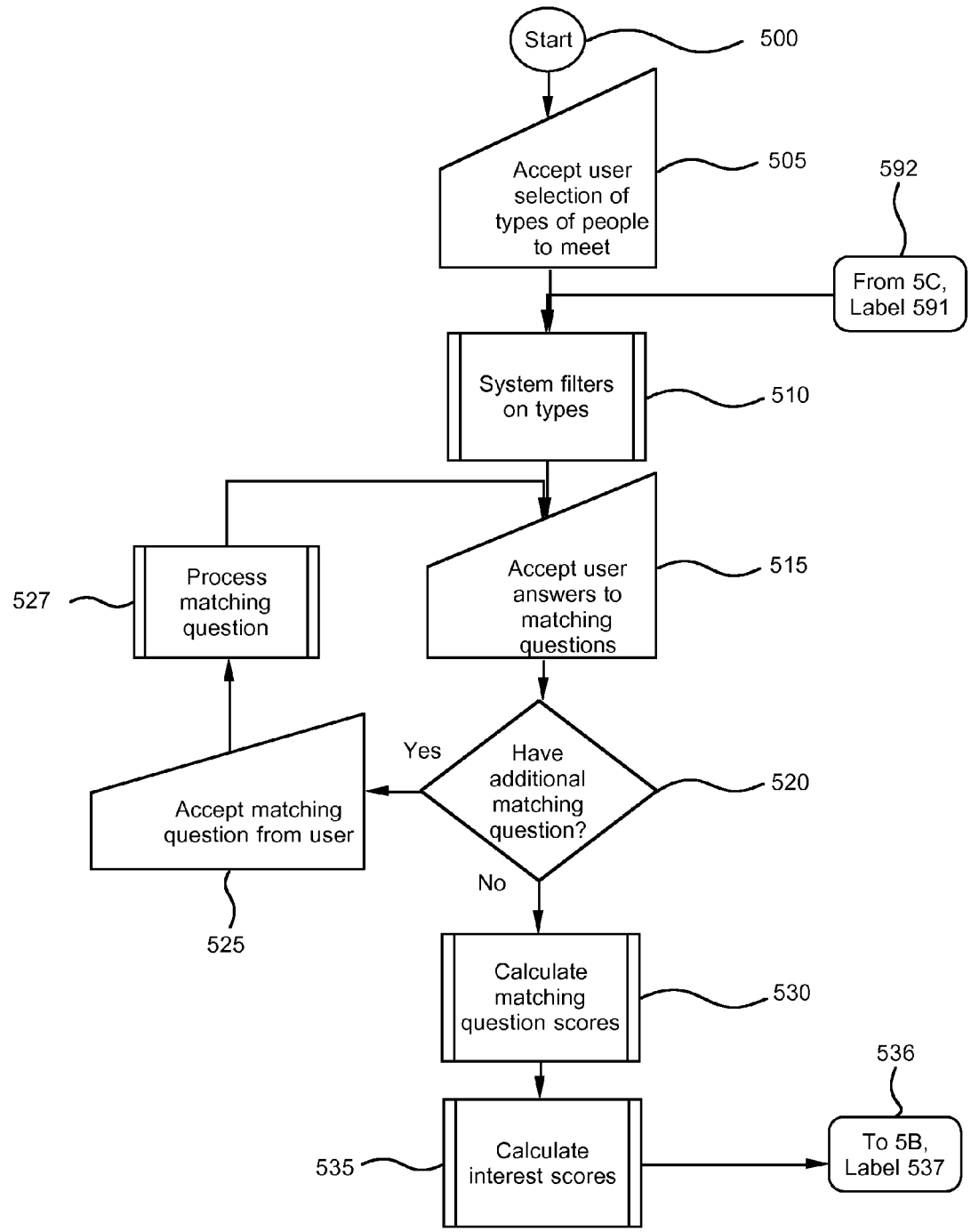
FIGS. 5A, 5B, and 5C illustrate an exemplary system that a participant uses at the event for answering questions, viewing matches, meeting, and connecting with other participants.
Figure 5B:
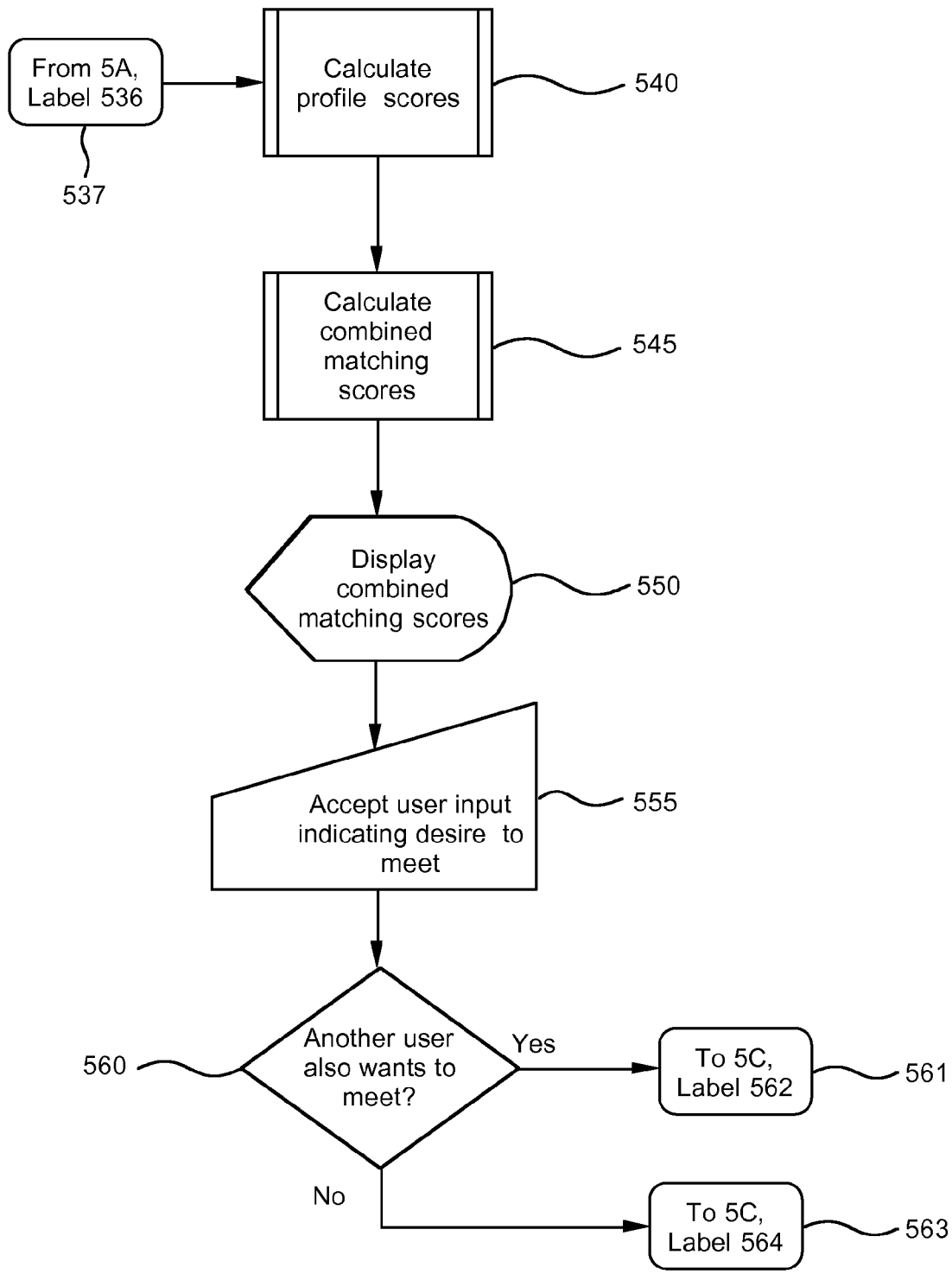
Figure 5C:
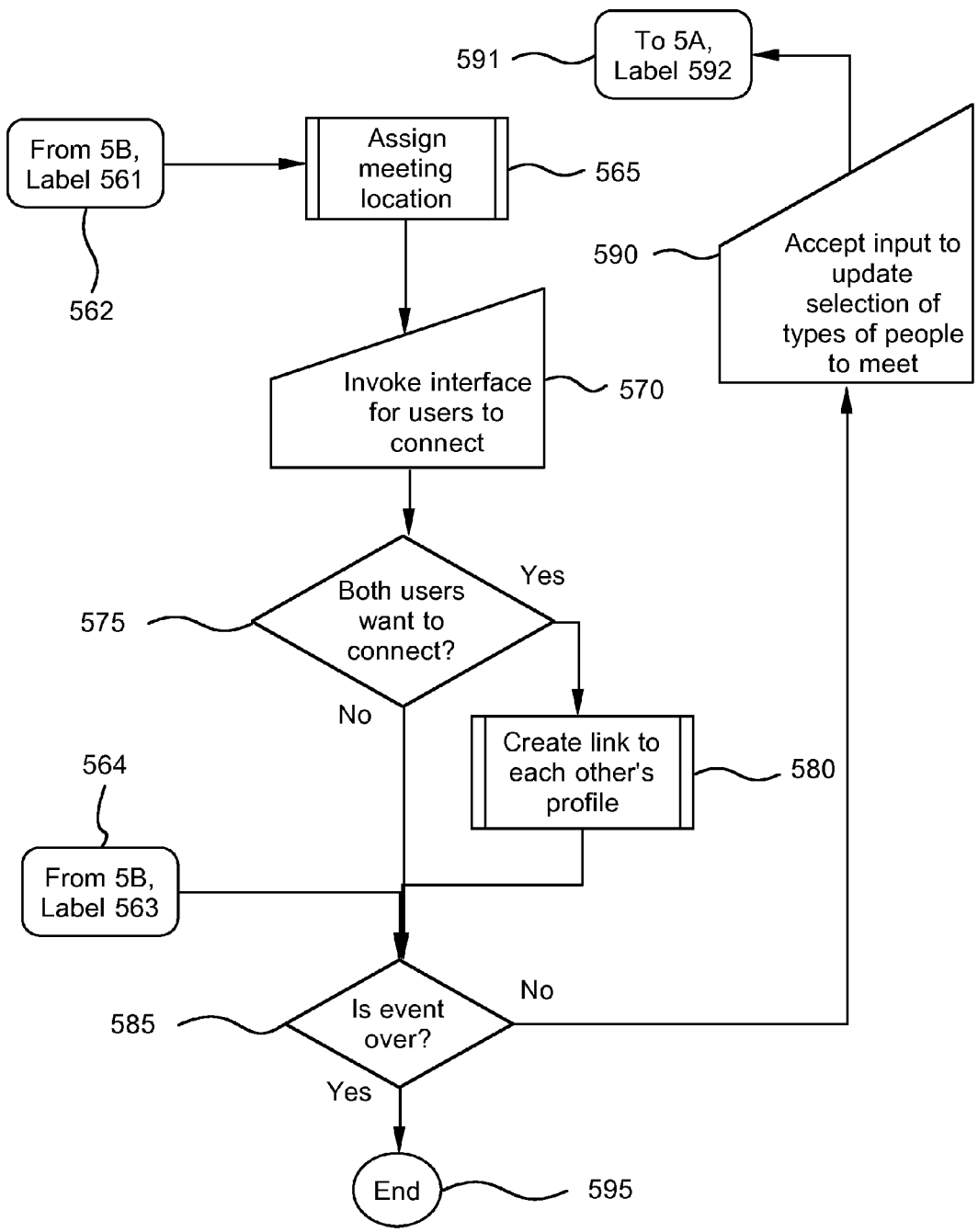

FIGS. 5A, 5B, and 5C describe the system's process of interacting with a user attending an event as summarized by step 150. The process begins at step 500. In step 505 the system accepts the user's input for which types of people to meet. In step 510 the system filters the list of candidates to process based on the types indicated by the user. In step 515 the system accepts the user's answers to a set of matching questions and optionally an indication of the importance of each question.

In step 520 the system responds to the user's choice of whether to submit matching questions to the organizer for review. If the result of step 520 is affirmative, the system proceeds to step 525 and accepts the user's submitted matching question. In step 527 the system processes the matching question by adding it to the set of matching questions handled by step 305. After processing the submitted matching question the system returns to step 515. In step 530 the system calculates the user's "matching question score" for each candidate based on the two users' answers to matching questions. The score is a weighted average of each matching question's score. The weight is based on the matching question's importance as specified by the organizer and/or the user. The matching question's score is a compatibility maximization formula, such as least squares or correlation.

In step 535 the system compares the interests in the user's profile to the interests of candidates to calculate an "interest score" for each candidate. In step 540 the system compares the most important words or phrases in the textual description in the user's profile to those of candidates to calculate a "profile score" for each candidate. In step 545 the system calculates a "combined matching score" for each candidate based on the previously calculated scores for that candidate from steps 530, 535, and 540. In step 550 the system displays the combined matching scores for the candidates on the user's computing device. In step 555 the system accepts the user's input indicating which candidates they want to meet.

In step 560 the system determines whether two users have both indicated an interest in meeting each other. If the result of the step is affirmative, the system proceeds to step 565 and provides a means for the users to contact each other (e.g., for physical events, it may assign a meeting spot to both users and displays that location to both users; for virtual events it may assign a chat room). In step 570 the system invokes an interface for the two users indicate whether they want to "connect." Two users are "connected" when the system has stored information in each user's profile linking them to the other user. This link provides each user with the other user's contact information.

In step 575 the system determines whether both users have requested a connection. If the result of the step is affirmative, the system proceeds to step 580 and designates that both users are linked as a "connection" of the other. At step 585 the system determines whether the event has concluded, as indicated by step 320. If the result is negative, the system proceeds to step 590, which accepts the user's input for optionally updating their selection of types of people to meet. The system then returns to step 510. If the result of step 585 is negative, the process terminates at step 595.

Figure 6:
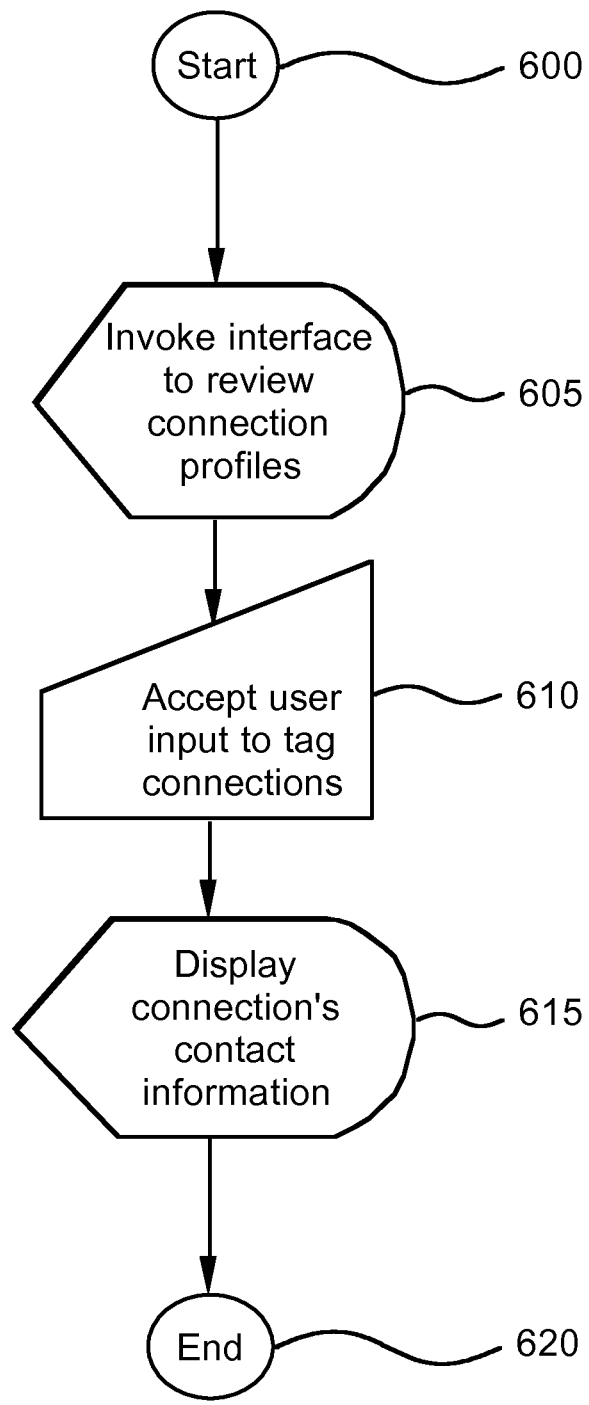
FIG. 6 illustrates an exemplary system with which a participant tags and contacts connections after the event has concluded.

FIG. 6 describes the process of the system allowing the user to follow up with other users after an event as summarized by step 160. The process begins at step 600. In step 605 the system invokes an interface with which the user may review the profiles of their connections in the system. In step 610 the system accepts and stores input from the user in the form of short pieces of text for a connection, called "tags," to identify and classify a connection to make it easy to find profiles with specific tags. In step 615 the system provides the user with contact information for their connections so they may initiate further communication with these connections via IM, SMS text, e-mail, telephone, in-person, etc. The process terminates at step 620.

Many of the above-described processes and modules may be implemented as software processes that are specified as a set of instructions recorded on a computer readable storage medium (also referred to as computer readable medium). When these instructions are executed by one or more computational element(s) (such as processors or other computational elements like ASICs and FPGAs), they cause the computational element(s) to perform the actions indicated in the instructions. Computer and computer system is meant in its broadest sense, and may include any electronic device with a processor including cellular telephones, smartphones, portable digital assistants, tablet devices, laptops, and netbooks. Examples of computer readable media include, but are not limited to, CD-ROMs, flash drives, RAM chips, hard drives, EPROMs, etc.

Figure 7:
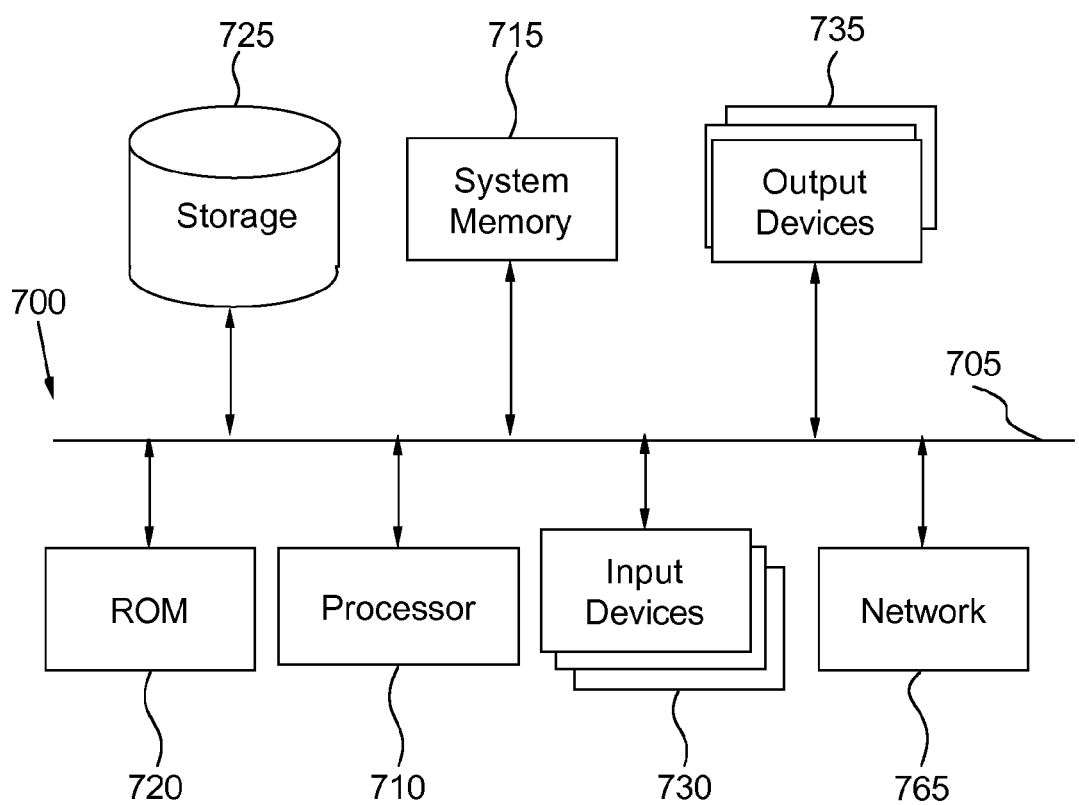
FIG. 7 illustrates an exemplary computer system in which certain embodiments and aspects of the present invention may be implemented.

FIG. 7 illustrates a computer system with which some embodiments are implemented. Such a computer system includes various types of computer readable mediums and interfaces for various other types of computer readable mediums that implement the various processes, modules, and engines described above. Computer system 700 includes a bus 705, a processor 710, a system memory 715, a read-only memory 720, a permanent storage device 725, input devices 730, and output devices 735.

The bus 705 collectively represents all system, peripheral, and chipset buses that communicatively connect the numerous internal devices of the computer system 700. For instance, the bus 705 communicatively connects the processor 710 with the read-only memory 720, the system memory 715, and the permanent storage device 725. From these various memory units, the processor 710 retrieves instructions to execute and data to process in order to execute the processes of the invention. The processor 710 is a processing device such as a central processing unit, integrated circuit, graphical processing unit, etc.

The read-only-memory (ROM) 720 stores static data and instructions that are needed by the processor 710 and other modules of the computer system. The permanent storage device 725, on the other hand, is a read-and-write memory device. This device is a non-volatile memory unit that stores instructions and data even when the computer system 700 is off. Some embodiments of the invention use a mass-storage device (such as a magnetic or optical disk and its corresponding disk drive) as the permanent storage device 725.

Other embodiments use a removable storage device (such as a flash drive) as the permanent storage device. Like the permanent storage device 725, the system memory 715 is a read-and-write memory device. However, unlike storage device 725, the system memory is a volatile read-and-write memory, such a random access memory (RAM). The system memory stores some of the instructions and data that the processor needs at runtime. In some embodiments, the processes are stored in the system memory 715, the permanent storage device 725, and/or the read-only memory 720.

The bus 705 also connects to the input and output devices 730 and 735. The input devices enable the user to communicate information and select commands to the computer system. The input devices 730 include any of a capacitive touchscreen, resistive touchscreen, any other touchscreen technology, a touchpad that is part of the computing system 700 or attached as a peripheral, a set of touch sensitive buttons or touch sensitive keys that are used to provide inputs to the computing system 700, or any other touch sensing hardware that detects multiple touches and that is coupled to the computing system 700 or is attached as a peripheral. The input devices 730 also include alphanumeric keypads (including physical keyboards and touchscreen keyboards), pointing devices (also called "cursor control devices"). The input devices 730 also include audio input devices (e.g., microphones, MIDI musical instruments, etc.). The output devices 735 display images generated by the computer system. The output devices include printers and display devices, such as cathode ray tubes (CRT) or liquid crystal displays (LCD).

Finally, as shown in FIG. 7, bus 705 also couples computer 700 to a network 765 through a network adapter (not shown). In this manner, the computer may be a part of a network of computers (such as a local area network ("LAN"), a wide area network ("WAN"), or an Intranet, or a network of networks, such as the Internet). For example, the computer 700 may be coupled to a web server (network 765) so that a web browser executing on the computer 700 may interact with the web server as a user interacts with a GUI that operates in the web browser.

As mentioned above, the computer system 700 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable Blu-ray discs, any other optical or magnetic media, and floppy disks.

While the above description contains many specifics and certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art, as mentioned above. The invention includes any combination or subcombination of the elements from the different species and/or embodiments disclosed herein. Thus, one of ordinary skill in the art would understand that the invention is not to be limited by the foregoing illustrative details, but rather is to be defined by the appended claims.

We claim:

1. A method for providing, across a computer network to a mobile display device associated with a person, a prioritized list of potential matches for said person to meet at an event, comprising the steps of:
   collecting event configuration data associated with said event prior to the commencement of said event;
   collecting user profile information from a plurality of users associated with said event prior to the commencement of said event;
   collecting user data associated with a portion of said event configuration data from said plurality of users across a computer network prior to the commencement of said event;
   collecting one or more updates to said user data across a computer network during said event;
   generating a prioritized list of potential matches associated with said person, based on said collecting of said event configuration data, on said collecting of said user data, and on said collecting of said updates to said user data; and
   transmitting said prioritized list via a computer network to a mobile display device associated with said person during said event, wherein said step of collecting event configuration data comprises:
   searching a master library for a first set of one or more matching questions that meet a set of search criteria of an organizer of said event;
   copying said first set of matching questions from said master library to said organizer's library;
   copying a second set of matching questions from said organizer's library to an event library; and
   receiving an indication of said organizer's weight of importance for each matching question in said second set of matching questions, to be used in the calculation of a compiled matching score for each pair of users associated with said event.

2. The method of claim 1, further comprising collecting a set of matching questions from an organizer of said event and analyzing the popularity of one or more of the questions in said set of matching questions after the completion of said event, based on said collecting of said event configuration data, on said collecting of said user data, and on said collecting of said updates to said user data.

3. The method of claim 1, further comprising providing an event organizer's interface for editing said second set of matching questions that accepts said organizer's selection of a portion of said second set of matching questions and saves said portion of said second set of matching questions.

4. The method of claim 1, further comprising displaying real-time statistics associated with said event on additional displays during said event, based on said collecting of said event configuration data, on said collecting of said user data, and on said collecting of said updates to said user data.

5. A method for providing, across a computer network to a mobile display device associated with a person, a prioritized list of potential matches for said person to meet at an event, comprising the steps of:
   collecting event configuration data associated with said event prior to the commencement of said event;
   collecting user profile information from a plurality of users associated with said event prior to the commencement of said event;
   collecting user data associated with a portion of said event configuration data from said plurality of users across a computer network during said event;
   generating a prioritized list of potential matches associated with said person, based on said collecting of said event configuration data and on said collecting of said user data; and
   transmitting said prioritized list via a computer network to a mobile display device associated with said person during said event, wherein said step of collecting event configuration data comprises:
   searching a master library for a first set of one or more matching questions that meet a set of search criteria of an organizer of said event;
   copying said first set of matching questions from said master library to said organizer's library;
   copying a second set of matching questions from said organizer's library to an event library; and
   receiving an indication of said organizer's weight of importance for each matching question in said second set of matching questions, to be used in the calculation of a compiled matching score for each pair of users associated with said event.

6. The method of claim 5, further comprising collecting a third set of matching questions from said organizer and analyzing the popularity of one or more of the questions in said third set of matching questions after the completion of said event, based on said collecting of said event configuration data and on said collecting of said user data.

7. The method of claim 5, further comprising providing an event organizer's interface for editing said second set of matching questions that accepts said organizer's selection of a portion of said second set of matching questions and saves said portion of said second set of matching questions.

8. The method of claim 5, further comprising displaying real-time statistics associated with said event on additional displays during said event, based on said collecting of said event configuration data and on said collecting of said user data.

9. A method for providing, across a computer network to a mobile display device associated with a person, a prioritized list of potential matches for said person to meet at an event, comprising the steps of:
   collecting event configuration data associated with said event prior to the commencement of said event;
   collecting user profile information from a plurality of users associated with said event prior to the commencement of said event;
   collecting user data associated with a portion of said event configuration data from said plurality of users across a computer network during said event;
   collecting one or more updates to said event configuration data across a computer network during said event;
   generating a prioritized list of potential matches associated with said person, based on said collecting of said event configuration data, on said collecting of said user data, and on said collecting of said updates to said event configuration data; and
   transmitting said prioritized list via a computer network to a mobile display device associated with said person during said event, wherein said step of collecting event configuration data comprises:
   searching a master library for a first set of one or more matching questions that meet a set of search criteria of an organizer of said event;
   copying said first set of matching questions from said master library to said organizer's library;
   copying a second set of matching questions from said organizer's library to an event library; and receiving an indication of said organizer's weight of importance for each matching question in said second set of matching questions, to be used in the calculation of a compiled matching score for each pair of users associated with said event.

10. The method of claim 9, further comprising providing an event organizer's interface for editing said second set of matching questions that accepts said organizer's selection of a portion of said second set of matching questions and saves said portion of said second set of matching questions.

11. The method of claim 9, further comprising displaying real-time statistics associated with said event on additional displays during said event, based on said collecting of said event configuration data and on said collecting of said user data.

12. The method of claim 9, wherein said event configuration data comprises a set of matching questions and a set of typing criteria, wherein a weight is associated with each said matching question and with each said typing criterion.

13. The method of claim 12, wherein each of said weights is adjustable.

14. The method of claim 13, wherein each of said weights is adjustable by an organizer of said event.

15. The method of claim 13, wherein each of said weights is adjustable based on said collecting of said event configuration data, on said collecting of said user data, and on said collecting of said updates to said event configuration data.

\* \* \* \* \*